(12) United States Patent
Chang

(10) Patent No.: US 11,697,377 B2
(45) Date of Patent: Jul. 11, 2023

(54) SUSPENDED TISSUE-BOX HOLDER ASSEMBLY

(71) Applicant: Thomas Wen-Terng Chang, Walnut Creek, CA (US)

(72) Inventor: Thomas Wen-Terng Chang, Walnut Creek, CA (US)

( * ) Notice: Subject to any disclaimer, the term of this patent is extended or adjusted under 35 U.S.C. 154(b) by 0 days.

(21) Appl. No.: 17/834,833

(22) Filed: Jun. 7, 2022

(65) Prior Publication Data
US 2022/0396211 A1 Dec. 15, 2022

Related U.S. Application Data

(60) Provisional application No. 63/210,924, filed on Jun. 15, 2021.

(51) Int. Cl.
*B60R 11/00* (2006.01)
*B60R 7/04* (2006.01)
*A47K 10/18* (2006.01)
*B60R 7/08* (2006.01)

(52) U.S. Cl.
CPC .............. *B60R 7/084* (2013.01); *B60R 11/00* (2013.01); *A47K 10/185* (2013.01); *B60R 7/043* (2013.01); *B60R 2011/0012* (2013.01); *B60R 2011/0059* (2013.01)

(58) Field of Classification Search
CPC . B60R 7/084; B60R 7/043; B60R 2011/0012; B60R 2011/0014; B60R 2011/0015; B60R 2011/0059; A47K 10/185
USPC .......................................... 224/275; 248/905
See application file for complete search history.

(56) References Cited

U.S. PATENT DOCUMENTS

| | | | |
|---|---|---|---|
| 5,803,325 A * | 9/1998 | Wang | B60R 7/12 224/572 |
| 5,868,294 A * | 2/1999 | Webster | B60R 7/043 224/572 |
| 6,971,697 B2 * | 12/2005 | Morales | B60R 7/043 220/495.07 |
| 10,493,923 B1 | 12/2019 | Moburg | |
| 2002/0195845 A1 | 12/2002 | Southwick | |

(Continued)

OTHER PUBLICATIONS

Car Net Pocket Handbag Holder, Retrieved from Amazon, Nov. 12, 2020 <URL: https://www.amazon.com/Handbag-Storage-Netting-Attaches-Headrest/dp/B08N9Y4N13>.

(Continued)

*Primary Examiner* — Justin M Larson

(57) ABSTRACT

A suspended tissue-box holder assembly is an assembly that enables users to suspend a tissue box in an accessible location within a vehicle so that the vehicle occupants can easily retrieve a tissue from the tissue box. The assembly may include a holder cover and a box holder. The box holder is designed to suspend a tissue box from two adjacent objects, such as vehicle seats. The holder cover encloses the box holder and facilitates the attachment of other accessories to the box holder. The box holder includes a holder body, a holder opening, a left suspension strap, and a right suspension strap. The holder body retains the tissue box and the holder opening enables the retrieval of a tissue from the tissue holder being retained within the holder body. The left suspension strap and the right suspension strap enable the suspension of the holder body from two adjacent objects.

20 Claims, 16 Drawing Sheets

(56) References Cited

U.S. PATENT DOCUMENTS

| | | |
|---|---|---|
| 2005/0151409 A1 | 7/2005 | Infanti |
| 2005/0161480 A1* | 7/2005 | Tirey .................. B60R 7/043 |
| | | 224/275 |
| 2008/0128460 A1* | 6/2008 | Adler .................. B60R 7/043 |
| | | 224/275 |
| 2013/0257114 A1* | 10/2013 | Lee .................. B60R 7/043 |
| | | 297/188.04 |

OTHER PUBLICATIONS

Cat Car Tissue Holder Back Hanging Tissue Box Covers, Retrieved from Walmart, Retrieved on Apr. 20, 2021 <URL: https://www.walmart.com/ip/3-Colors-Cute-Lucky-Cat-Car-Tissue-Holder-Back-Hanging-Tissue-Box-Covers-Napkin-Paper-Towel-Box-Holder-Case-Paper-Towel-Holder/655013955>.

\* cited by examiner

SUSPENDED TISSUE-BOX HOLDER ASSEMBLY

The current application claims a priority to the U.S. provisional patent application Ser. No. 63/210,924 filed on Jun. 15, 2021.

FIELD OF THE INVENTION

The present invention relates generally to vehicle accessories and personal hygiene products. More specifically, the present invention is a tissue box holder that can be hung between two adjacent objects such as the head rests of the passenger seat and the driver seat of a vehicle.

BACKGROUND OF THE INVENTION

Driving is the most popular method of transportation in most countries. Most people must drive to get to work, school, or even just to get lunch. Sometimes while on the commute, the driver or a passenger may have the need for a tissue to clear their nasal passages or for other tasks such as cleaning a small spill. The driver is often forced to scramble around the vehicle looking for a tissue or other item to clear their nose. This can lead to reckless driving as the driver gets distracted and performs dangerous behavior such as swerving on the road. To compensate, most drivers store tissues in their glove compartments, sunglasses holders, or even cupholders. Storing tissues in these places can cause clutter and disorganization. Most times, there is not a designated place to dispose of the tissues as well. Moreover, the driver usually uses an improvised trash bag or a cup holder to store the used tissues until the driver can dispose of them properly. Sometimes a passenger is even assigned the duty of finding and distributing tissues to other passengers. Overall, using tissues while in a vehicle can be a major inconvenience when the necessary equipment for storage and disposal is not present. A driver needs to be able to find, use, and dispose of tissues while being focused on the road.

An objective of the present invention is to provide a suspended tissue-box holder assembly that ensures the availability and accessibility of tissues for every passenger in the vehicle. The present invention enables the hanging of a tissue box or similar tissue container between two car seats, preferably the driver seat and the passenger seat, for easy accessibility of tissues to everyone in the vehicle. Another objective of the present invention is to provide a suspended tissue-box holder assembly that facilitates the disposal of used tissues. The present invention provides a waste container that is connected to the rest of the assembly for quick and easy disposal of used tissues. Another objective of the present invention is to provide a suspended tissue-box holder assembly that can accommodate tissue boxes of different sizes and provide different ornamental customization options. Additional features and benefits of the present invention are further discussed in the sections below.

SUMMARY OF THE INVENTION

The present invention provides a suspended tissue-box holder assembly that enables the user to maintain a tissue box or similar tissue container in a readily available manner so that anyone in a vehicle has access to a tissue. With the present invention, vehicle passengers no longer must scramble for tissues in a vehicle or distract the driver while searching for a tissue. Instead, the present invention provides easy access to tissues to all the vehicle passengers. The present invention includes a box holder designed to suspend a tissue box in between two adjacent objects, preferably the headrests of the passenger seat and the driver seat.

The box holder can accommodate different sizes of tissue boxes by including an inflatable riser that ensures that the tissue box tightly fits inside the box holder. In addition, the present invention includes a waste container that receives the used tissues and other waste. The waste container can be hung from the box holder so that the overall assembly takes the least space possible within the vehicle. Further, the present invention includes a holder cover that embellishes the overall assembly. The holder cover can be a customizable accessory that improves the ornamental look of the present invention while also facilitating the attachment of other accessories to the present invention.

DETAIL DESCRIPTIONS OF THE INVENTION

Figure 1:
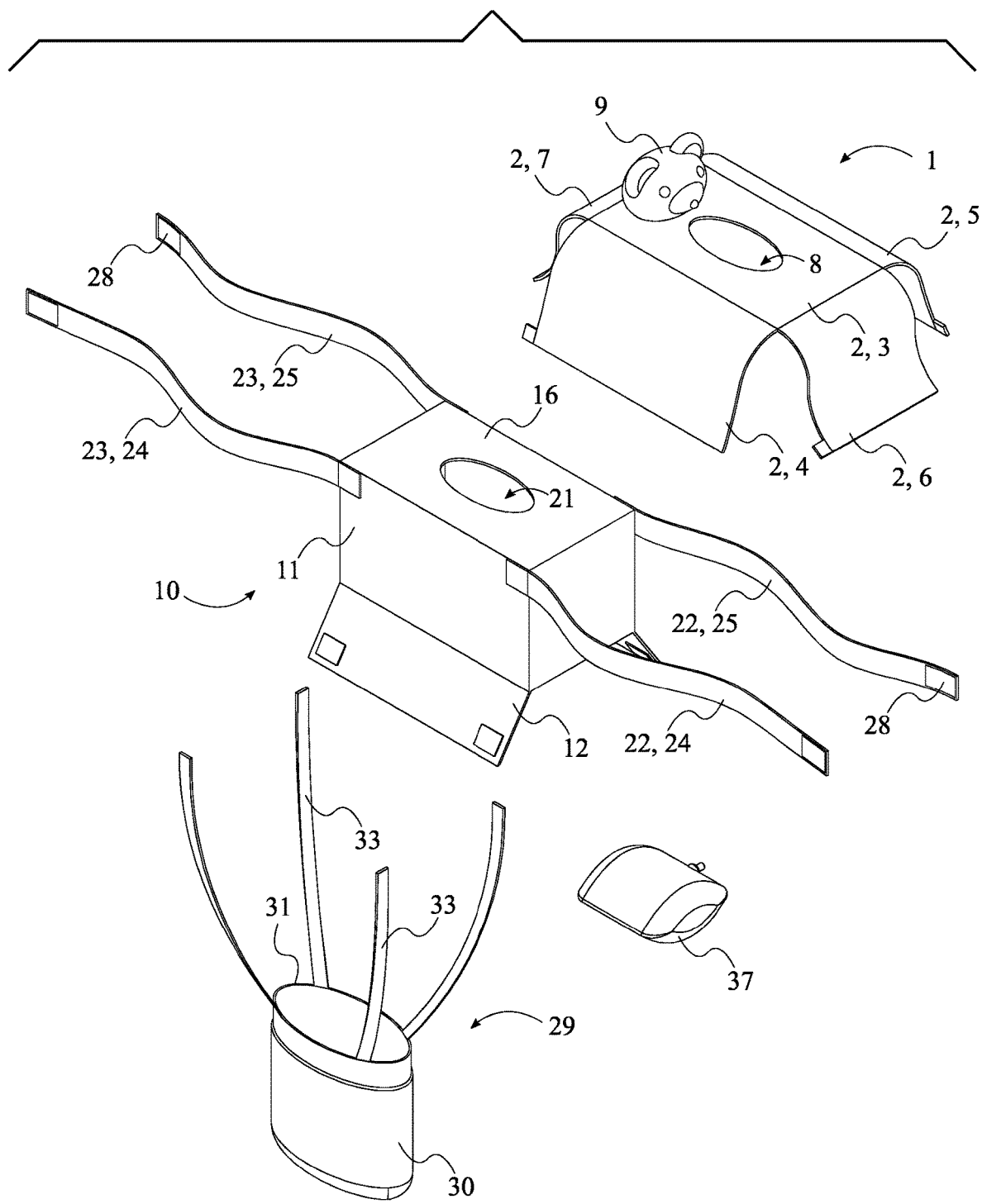
FIG. 1 is an exploded top front perspective view showing the present invention.
Figure 2:
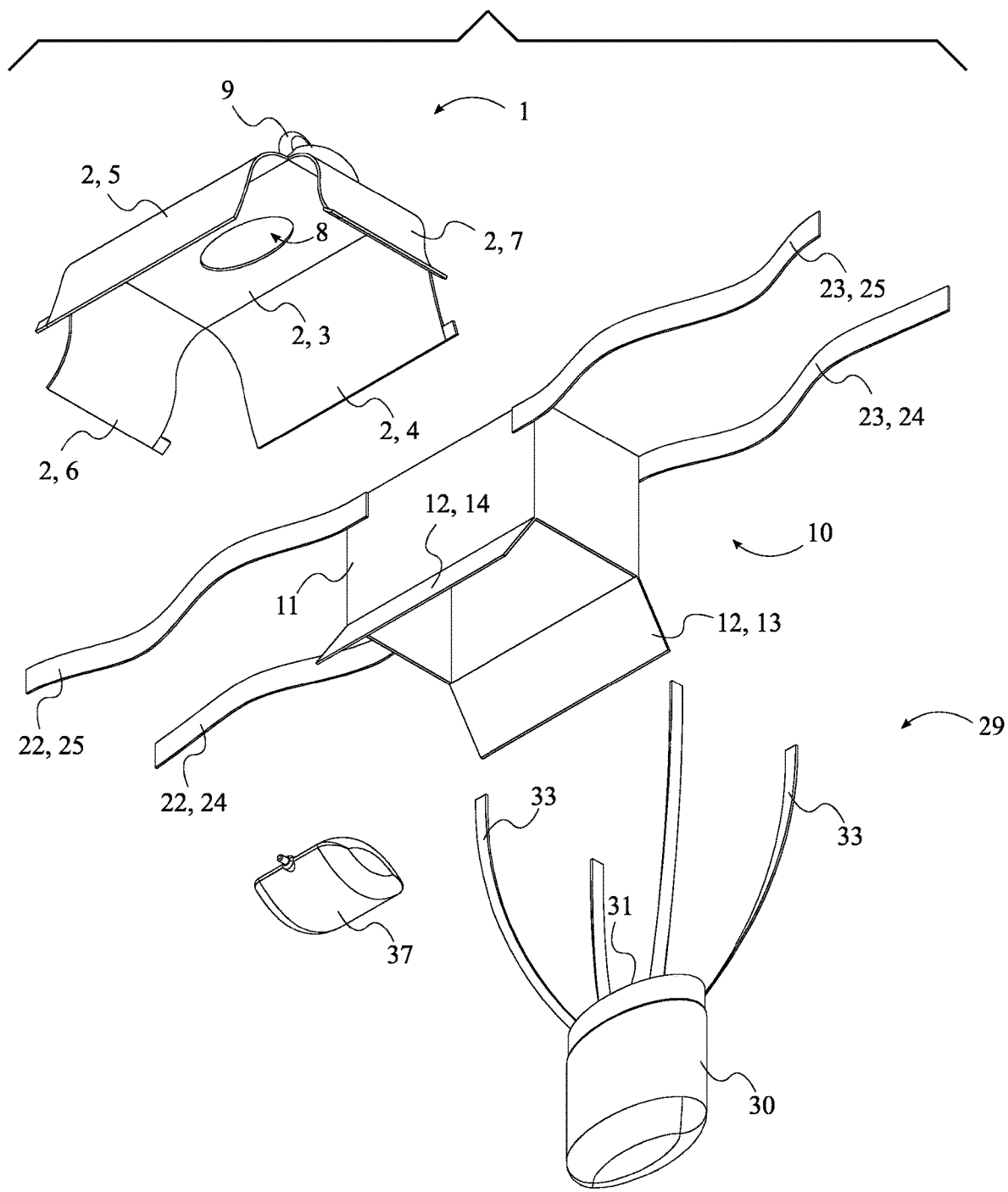
FIG. 2 is an exploded bottom rear perspective view showing the present invention.

All illustrations of the drawings are for the purpose of describing selected versions of the present invention and are not intended to limit the scope of the present invention.

The present invention is a suspended tissue-box holder assembly that enables users to suspend a tissue box in an accessible location within a vehicle so that the driver and all the passengers can easily retrieve a tissue from the tissue box without distracting the driver. As can be seen in FIG. 1 through 6, to do so, the present invention may comprise a holder cover 1 and a box holder 10. The box holder 10 is designed to suspend a tissue box from two adjacent objects such as the headrests of the passenger seat and the driver seat of a vehicle for easy access to the tissue box from all passengers. The holder cover 1 encloses the box holder 10 to embellish the present invention as well as to facilitate the attachment of other accessories to the box holder 10 for greater functionality of the present invention.

The general configuration of the aforementioned components enables users to maintain a tissue box accessible to all the passengers inside the vehicle. As can be seen in FIGS. 1 through 10, the box holder 10 is designed to retain tissue boxes of different sizes at a location where all the passengers in the vehicle can have easy access to a tissue. To do so, the box holder 10 comprises a holder body 11, a holder opening 21, a left suspension strap 22, and a right suspension strap 23. The holder body 11 corresponds to the structure that retains the tissue box while facilitating the access to the tissues being held within. So, the holder body 11 is preferably a hollow rectangular structure with a size large enough to accommodate most tissues available in the market. However, in other embodiments, the holder body 11 can be provided in different shapes to accommodate non-rectangular tissue containers. The holder opening 21 enables access into the holder body 11 to retrieve a tissue from the tissue holder being retained within the holder body 11. The left suspension strap 22 and the right suspension strap 23 enable the suspension of the holder body 11 from two adjacent objects, such as two vehicle seats. To facilitate the housing of the tissue box within the box holder 10, the holder body 11 comprises a holder hatch 12 and a top panel 16. The holder hatch 12 enables the user to insert the tissue box into the holder body 11 while securely holding the tissue box within the holder body 11. The top panel 16 preferably corresponds to the panel that receives the holder cover 1. The holder cover 1 is preferably designed to match the shape and size of the holder body 11. Accordingly, the holder cover 1 comprises a cover body 2 matching the shape and size of the holder body 11 and a cover opening 8 matching the shape and size of the holder opening 21. This way, when the box holder 10 and the holder cover 1 are put together, the holder cover 1 fits perfectly onto the box holder 10 to form a symmetrical assembly.

As can be seen in FIGS. 1 through 10, to assemble the present invention, the top panel 16 and the holder hatch 12 are positioned opposite to each other about the holder body 11. The top panel 16 is preferably oriented upwards away from the ground, while the holder hatch 12 is oriented towards the ground. Further, the holder opening 21 traverses into the holder body 11 through the top panel 16 so that the user can reach into the holder body 11 and retrieve a tissue from the box of tissues within the holder body 11. The left suspension strap 22 and the right suspension strap 23 are positioned opposite to each other about the holder body 11 so that the holder body 11 can be suspended from two adjacent objects. To secure the left suspension strap 22 to the holder body 11, the left suspension strap 22 is laterally connected to the holder body 11, adjacent to the top panel 16. Similarly, the right suspension strap 23 is laterally connected to the holder body 11, adjacent to the top panel 16, to secure the right suspension strap 23 to the holder body 11. Then, the cover opening 8 traverses through the cover body 2 so that when the cover body 2 is placed on the holder body 11, the user can still have access to the interior of the holder body 11 to have access to the tissues retained within. In addition, the cover opening 8 is positioned coincident with the holder opening 21 to align both openings. Finally, the cover body 2 is mounted onto the holder body 11, thus forming a single uniform structure.

As previously discussed, the holder body 11 is preferably a hollow rectangular structure that accommodates most of the tissue boxes currently available in the market. Accordingly, the holder body 11 may comprise a front lengthwise panel 17, a rear lengthwise panel 18, a left widthwise panel 19, and a right widthwise panel 20 corresponding to the lateral panels of the rectangular structure, as can be seen in FIGS. 7 through 10. The front lengthwise panel 17 and the rear lengthwise panel 18 are positioned opposite to each other about the holder body 11. Similarly, the left widthwise panel 19 and the right widthwise panel 20 are positioned opposite to each other about the holder body 11. Further, the left widthwise panel 19 and the right widthwise panel 20 are positioned in between the front lengthwise panel 17 and the rear lengthwise panel 18. This way, the four panels shape the holder body 11 as a rectangular structure. The left widthwise panel 19, the right widthwise panel 20, the front lengthwise panel 17, and the rear lengthwise panel 18 are also positioned perpendicular to the top panel 16 to form a rectangular holder body 11 with a closed top base. Furthermore, the left suspension strap 22 is laterally connected to the left widthwise panel 19. Similarly, the right suspension strap 23 is laterally connected to the right widthwise panel 20. This way, when the holder body 11 is suspended from two adjacent objects, such as two adjacent vehicle seats, the holder body 11 is positioned such as the top panel 16 is oriented away from the floor of the vehicle while the holder hatch 12 is oriented towards the floor of the vehicle.

Figure 3:
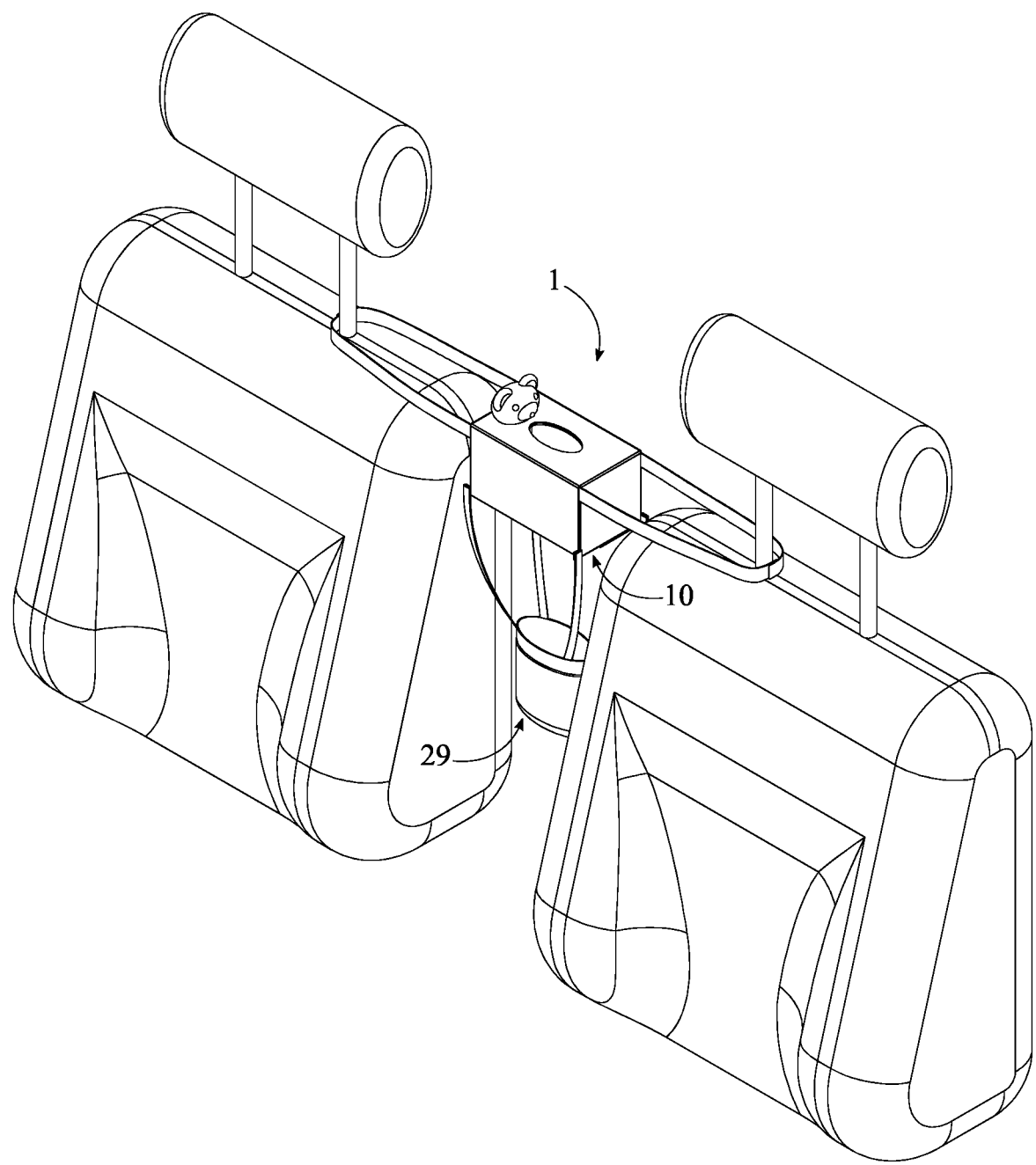
FIG. 3 is a top front perspective view showing the present invention, wherein the present invention is shown suspended from two adjacent vehicle seats.
Figure 4:
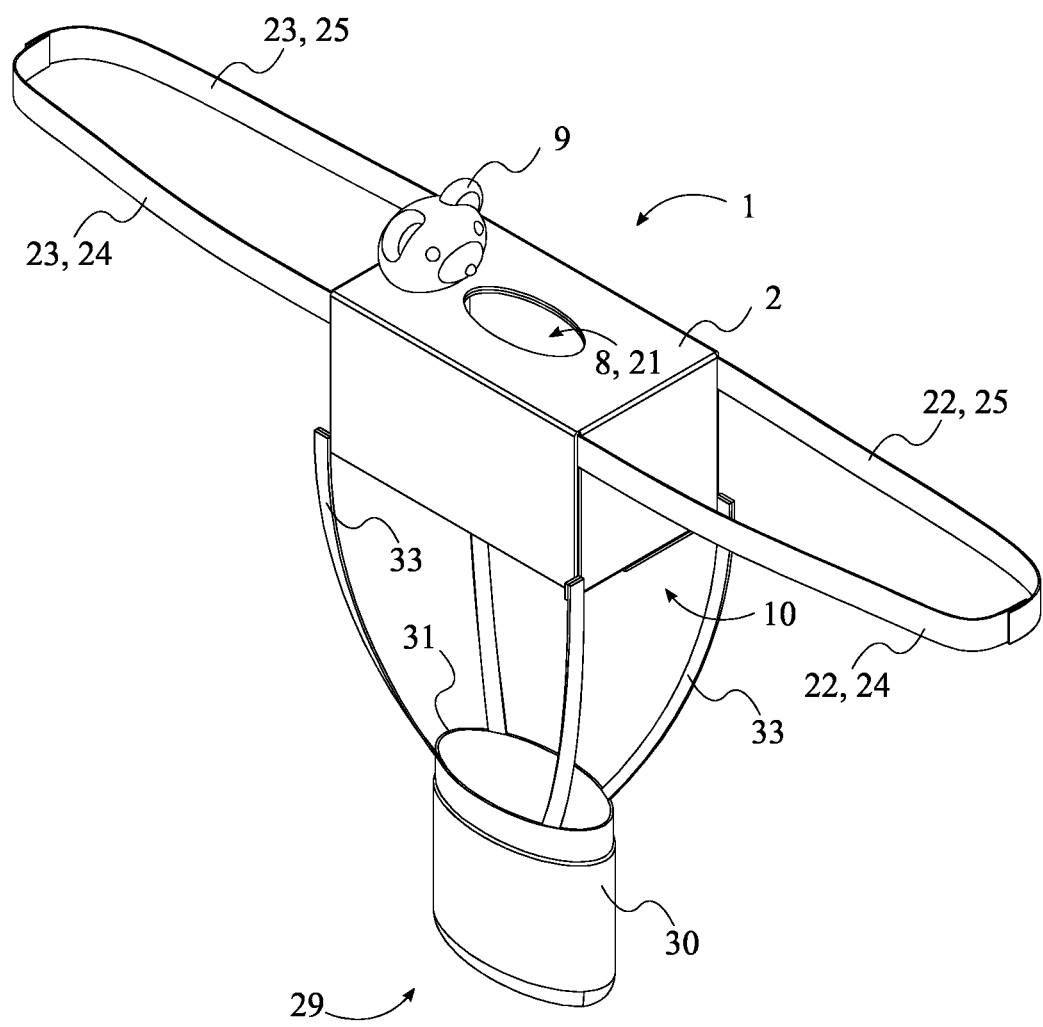
FIG. 4 is a top front perspective view showing the present invention, wherein the present invention is shown in condition of use.
Figure 5:
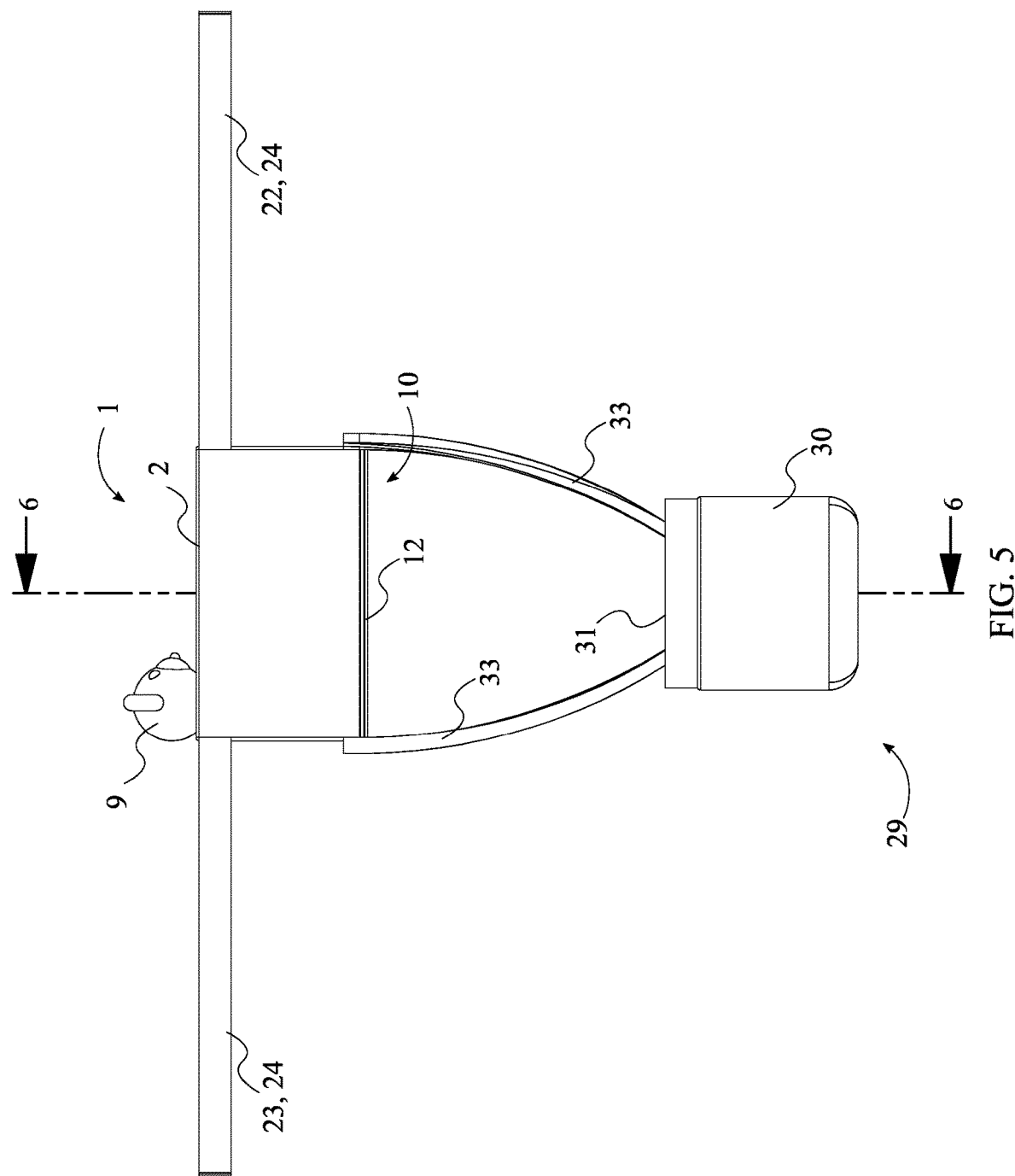
FIG. 5 is a front view showing the present invention, wherein the present invention is shown in condition of use.
Figure 6:
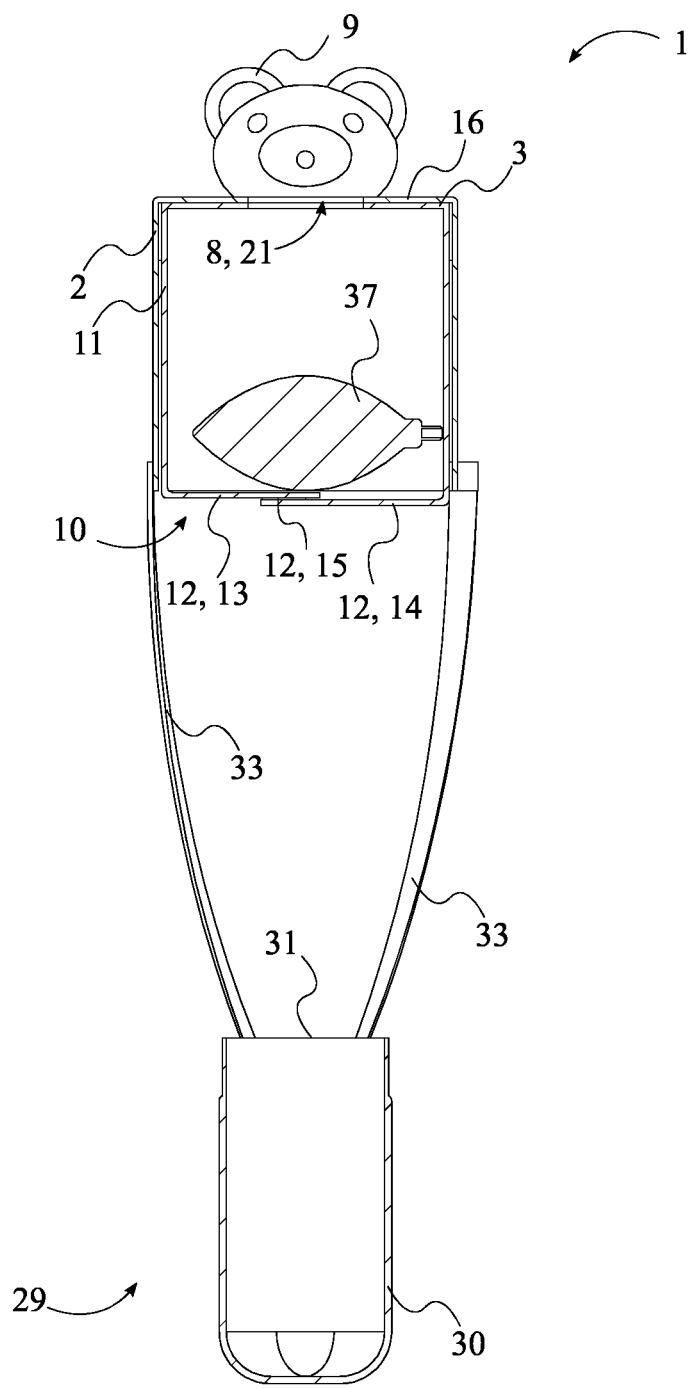
FIG. 6 is an enlarged cross-sectional view taken along line 6-6 in FIG. 5.
Figure 7:
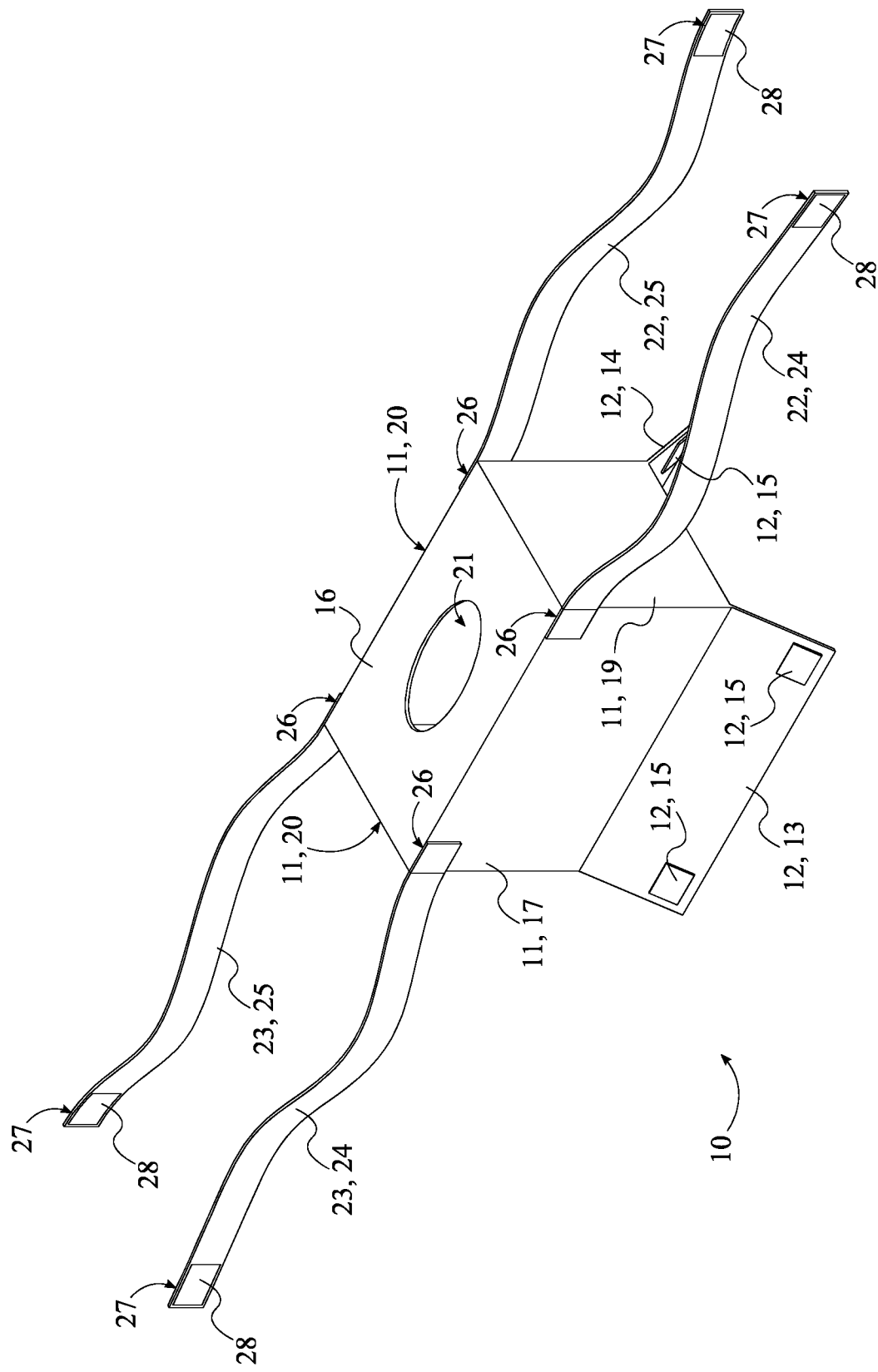
FIG. 7 is a top front perspective view showing the box holder of the present invention.
Figure 8:
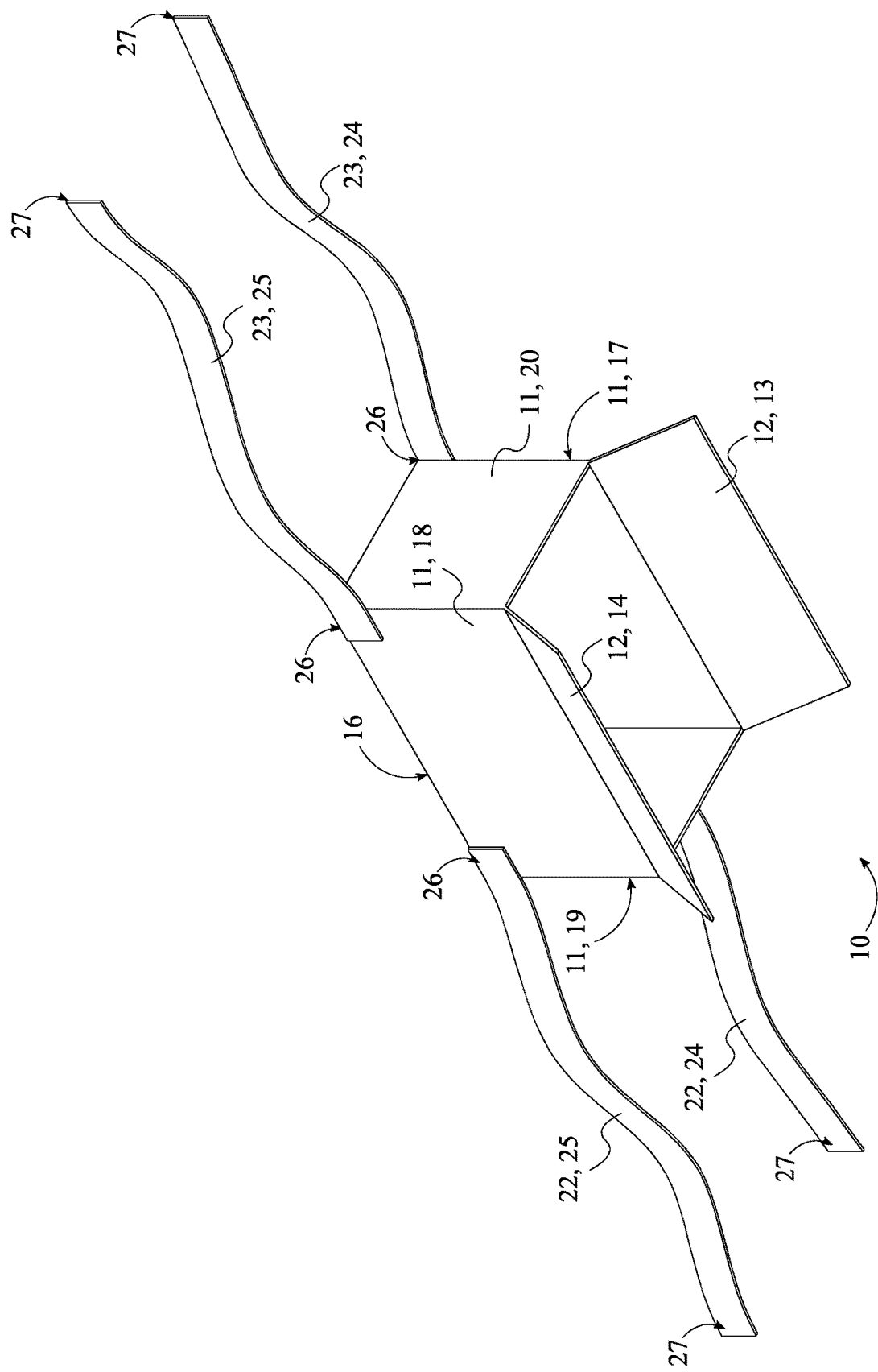
FIG. 8 is a bottom rear perspective view showing the box holder of the present invention.
Figure 9:
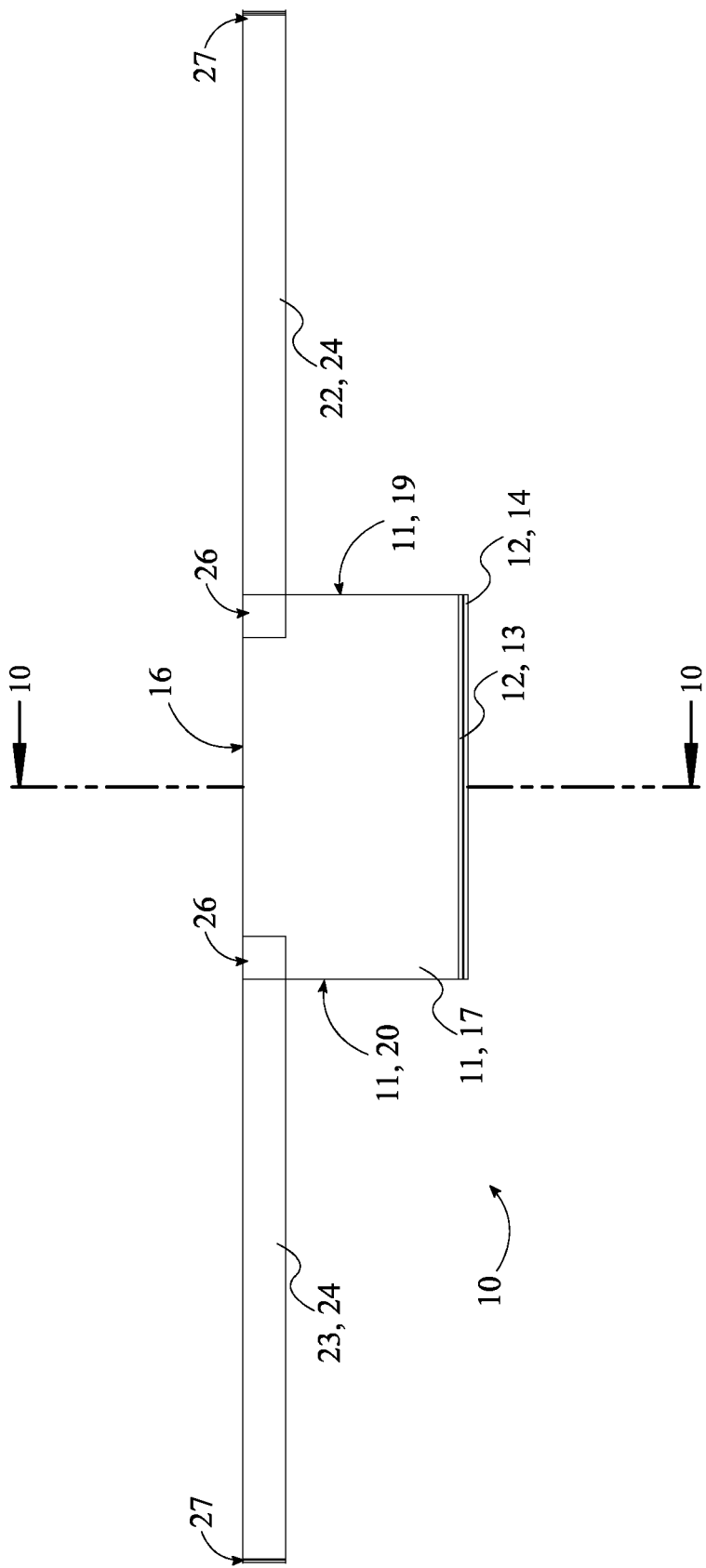
FIG. 9 is a front view showing the box holder of the present invention, wherein the box holder is shown in condition of use.
Figure 10:
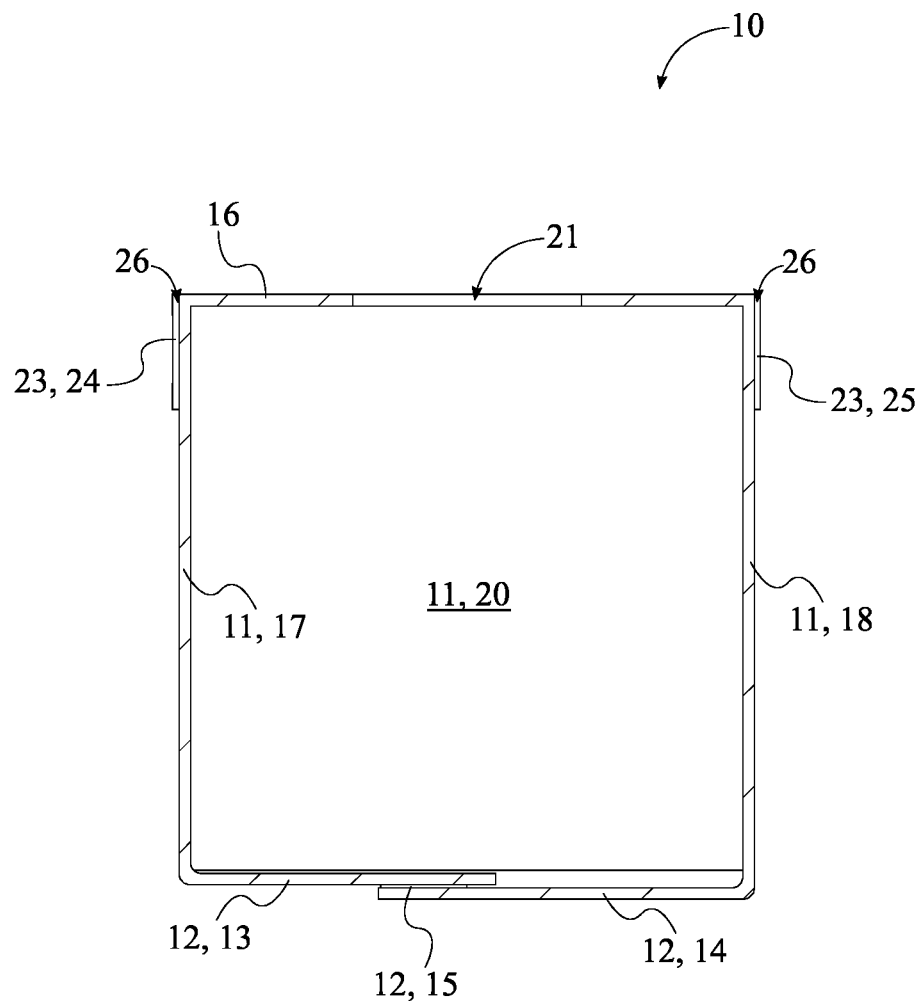
FIG. 10 is an enlarged cross-sectional view taken along line 10-10 in FIG. 9.

As can be seen in FIGS. 7 through 10, to ensure that holder body 11 is properly balanced when suspended from two adjacent objects, the left suspension strap 22 and the right suspension strap 23 are designed to spread the load from the holder body 11. To do so, the left suspension strap 22 and the right suspension strap 23 may each comprise a first strap section 24, a second strap section 25, and a strap fastener 28. The first strap section 24 and the second strap section 25 correspond to shorter pieces of straps that can be connected using the strap fastener 28 to form a larger strap body. Due to the strap design of each section, the first strap section 24 and the second strap section 25 each comprises a proximal strap end 26 and a distal strap end 27 corresponding to the terminal ends of each strap section. Further, the proximal strap end 26 of the first strap section 24 of the left suspension strap 22 is connected to the left widthwise panel 19, adjacent to the front lengthwise panel 17. The proximal strap end 26 of the second strap section 25 of the left suspension strap 22 is also connected to the left widthwise panel 19, adjacent to the rear lengthwise panel 18. This way, when the holder body 11 is being suspended by the left suspension strap 22, the holder body 11 does not tilt forwards or backwards as the vehicle moves. Like the left suspension strap 22, the proximal strap end 26 of the first strap section 24 of the right suspension strap 23 is connected to the right widthwise panel 20, adjacent to the front lengthwise panel 17. The proximal strap end 26 of the second strap section 25 of the right suspension strap 23 is also connected to the right widthwise panel 20, adjacent to the rear lengthwise panel 18. This way, when the holder body 11 is being suspended by the right suspension strap 23, the holder body 11 does not tilt forwards or backwards as the vehicle moves. Finally, the distal strap end 27 of the first strap section 24 and the distal strap end 27 of the second strap section 25 are attached onto each other by the strap fastener 28, thus forming a single suspension strap on both sides. The design of the first strap section 24 and the second strap section 25 enables the suspension of the holder body 11 from existing adjacent bodies, such as the headrests of the passenger seat and the driver seat of a vehicle, as can be seen in FIG. 3. However, in other embodiments, different suspension mechanisms, such as a chain and hook, can be used instead of suspension straps.

As previously discussed, the holder hatch 12 is the only way through which the user can insert the tissue box into the box holder 10. As can be seen in FIGS. 7 through 10, to do so, the holder hatch 12 may comprise a first hatch panel 13, a second hatch panel 14, and a hatch fastener 15. The first hatch panel 13 and the second hatch panel 14 correspond to two smaller panel sections that can be detachably connected using the hatch fastener 15 to form a larger panel. This enables the opening and closing of the holder hatch 12 to enable the insertion/retrieval of the tissue box as well as the retention of the tissue box once the tissue box is placed within the box holder 10. To do so, the first hatch panel 13 is hingedly connected to the front lengthwise panel 17 while the second hatch panel 14 is hingedly connected to the rear lengthwise panel 18. This way, both the first hatch panel 13 and the second hatch panel 14 can be moved towards/away from each other to close/open the holder hatch 12, respectively. Further, the first hatch panel 13 the second hatch panel 14 are attached onto each other by the hatch fastener 15 to maintain the first hatch panel 13 the second hatch panel 14 connected to retain the tissue box within the box holder 10. The hatch fastener 15 can be several pieces of hook and loop fasteners distributed on different portions of the first hatch panel 13 the second hatch panel 14. Alternatively, the hatch fastener 15 can be replaced with other fasteners, such as a zipper, snap buttons, etc.

Figure 11:
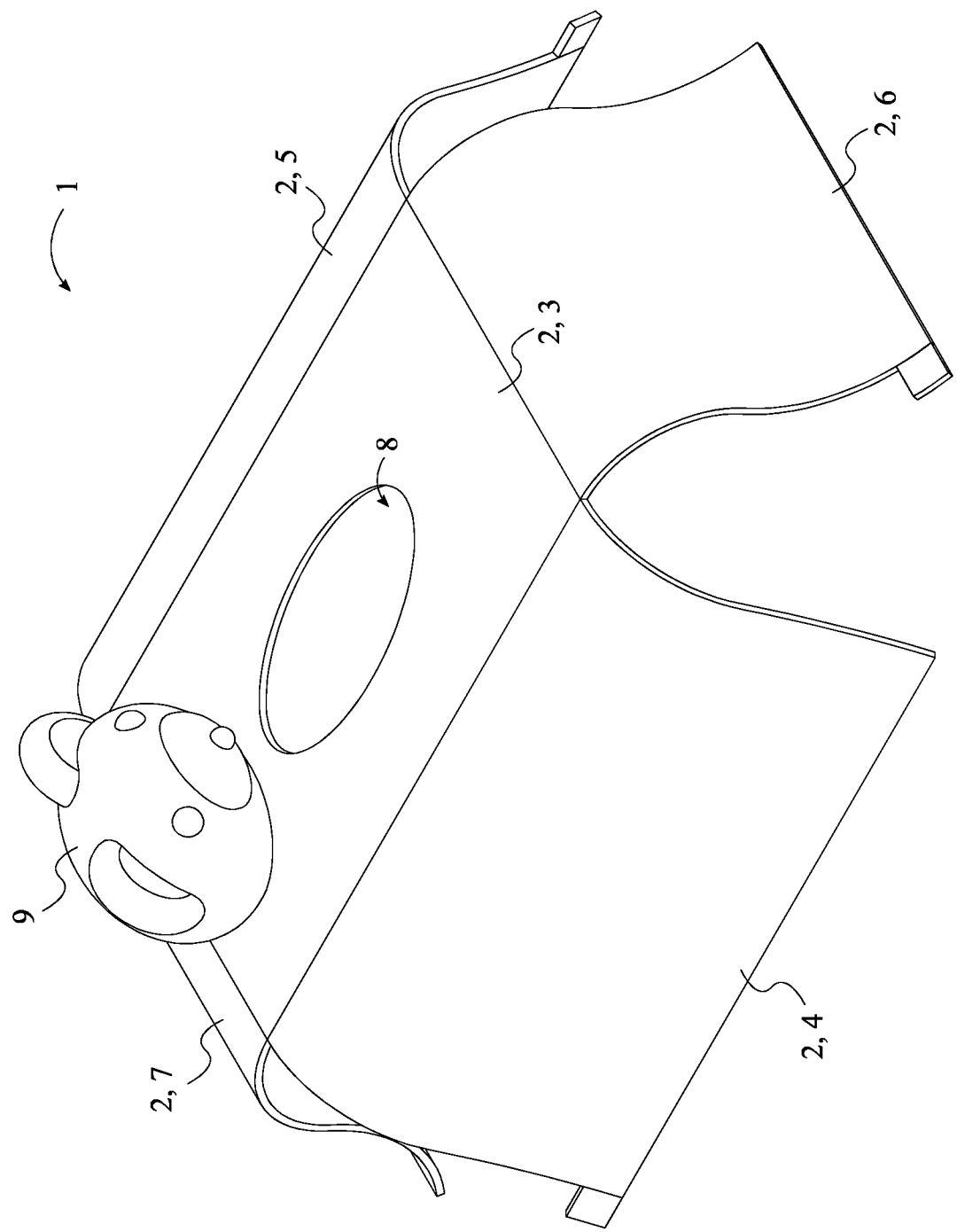
FIG. 11 is a top front perspective view showing the holder cover of the present invention.
Figure 12:
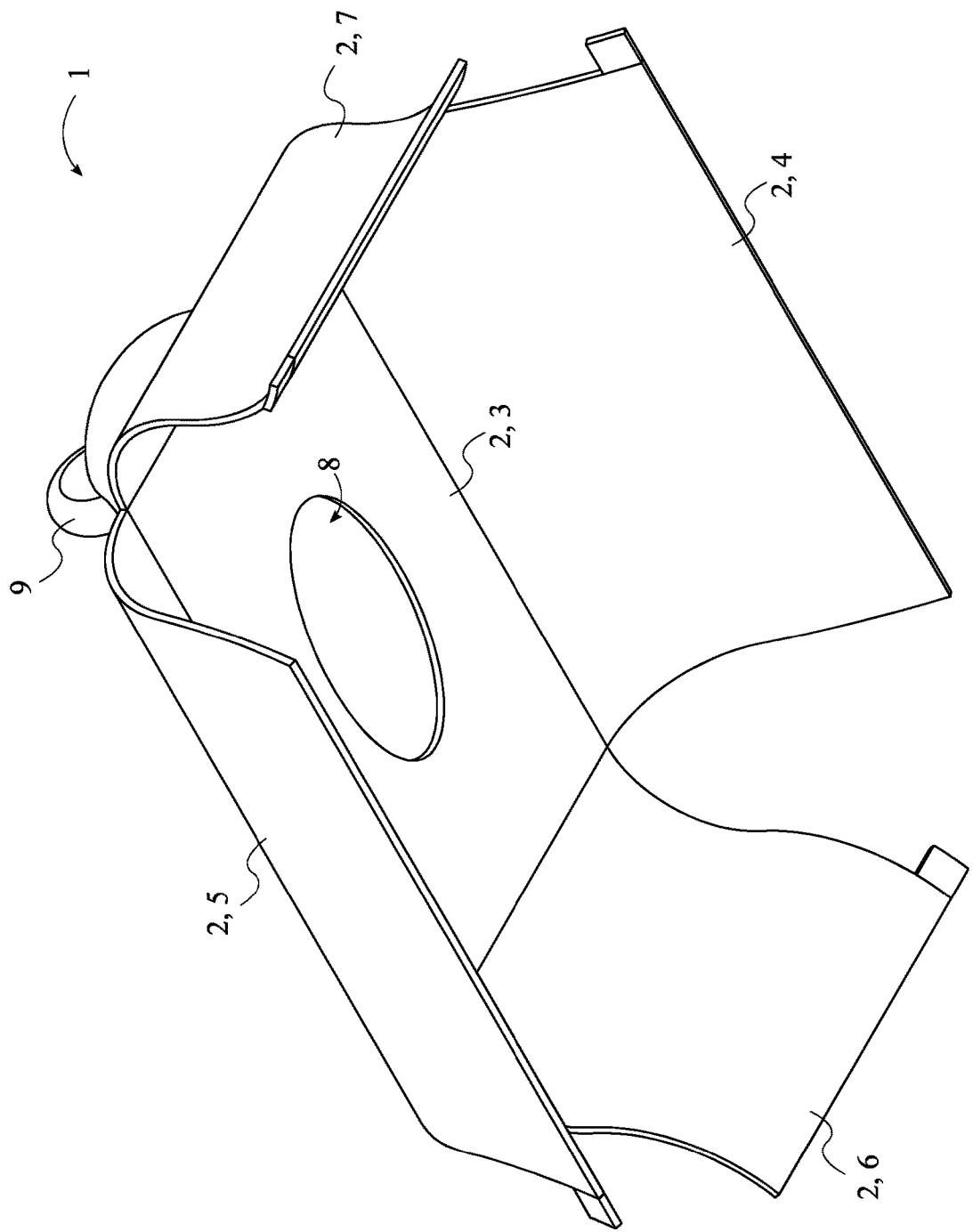
FIG. 12 is a bottom rear perspective view showing the holder cover of the present invention.

As can be seen in FIGS. 11 and 12, the cover body 2 is preferably designed to match the shape and size of the holder body 11. To do so, the cover body 2 may comprise a cover panel 3, a front lengthwise flap 4, a rear lengthwise flap 5, a left widthwise flap 6, and a right widthwise flap 7. The cover panel 3 is preferably the center panel of the cover body 2, and the cover panel 3 is positioned onto and across the top panel 16 to cover the top panel 16. On the other hand, the front lengthwise flap 4, the rear lengthwise flap 5, the left widthwise flap 6, and the right widthwise flap 7 are designed to cover the front lengthwise panel 17, the rear lengthwise panel 18, the left widthwise panel 19, and the right widthwise panel 20 of the holder body 11, respectively. To do so, the front lengthwise flap 4 and the rear lengthwise flap 5 are positioned opposite to each other across the cover panel 3. Similarly, the left widthwise flap 6 and the right widthwise flap 7 are positioned opposite to each other across the cover panel 3. To form a similar rectangular structure as the holder body 11, the left widthwise flap 6 and the right widthwise flap 7 are positioned in between the front lengthwise flap 4 and the rear lengthwise flap 5. Further, the front lengthwise flap 4, the rear lengthwise flap 5, the left widthwise flap 6, and the right widthwise flap 7 are hingedly connected to the cover panel 3. This way, when the cover panel 3 is placed onto the top panel 16, the front lengthwise flap 4 is positioned onto the front lengthwise panel 17, the rear lengthwise flap 5 is placed onto the rear lengthwise panel 18, the left widthwise flap 6 is placed onto the left widthwise panel 19, and the right widthwise flap 7 is positioned onto the right widthwise panel 20. Thus, the cover body 2 fully covers the holder body 11. In other embodiments, the cover body 2 may have different shapes that do not match the holder body 11 to form a different ornamental look.

As can be seen in FIGS. 11 and 12, to further improve the ornamental look of the present invention, the holder cover 1 may further comprise a cover ornament 9. The cover ornament 9 can serve multiple purposes in addition to embellishing the look of the present invention. For example, the cover ornament 9 can help locate the tissue box, can help grab the attention of children in the vehicle, etc. To do so, the cover ornament 9 is positioned adjacent to the cover opening 8 without obstructing the cover opening 8 so that users can freely retrieve tissues from inside the holder body 11. Further, the cover ornament 9 is mounted onto the cover panel 3, opposite to the holder body 11, to secure the cover ornament 9 to the cover body 2. In alternate embodiments, the cover ornament 9 can be replaced with other attachments that increase the functionality of the present invention.

To help the user to collect used tissues and other waste in a single location, the present invention may further comprise a waste container 29. As can be seen in FIGS. 1 through 6, the waste container 29 is designed to retain used tissues and other waste until the user can empty out the contents into an appropriate waste collector. To do so, the waste container 29 is positioned offset from the holder hatch 12 to separate the used tissues and other waste from the holder body 11. Further, the waste container 29 is tethered to the cover body 2 to secure the waste container 29 to the holder body 11 so that the overall assembly takes the least space in the vehicle.

Figure 13:
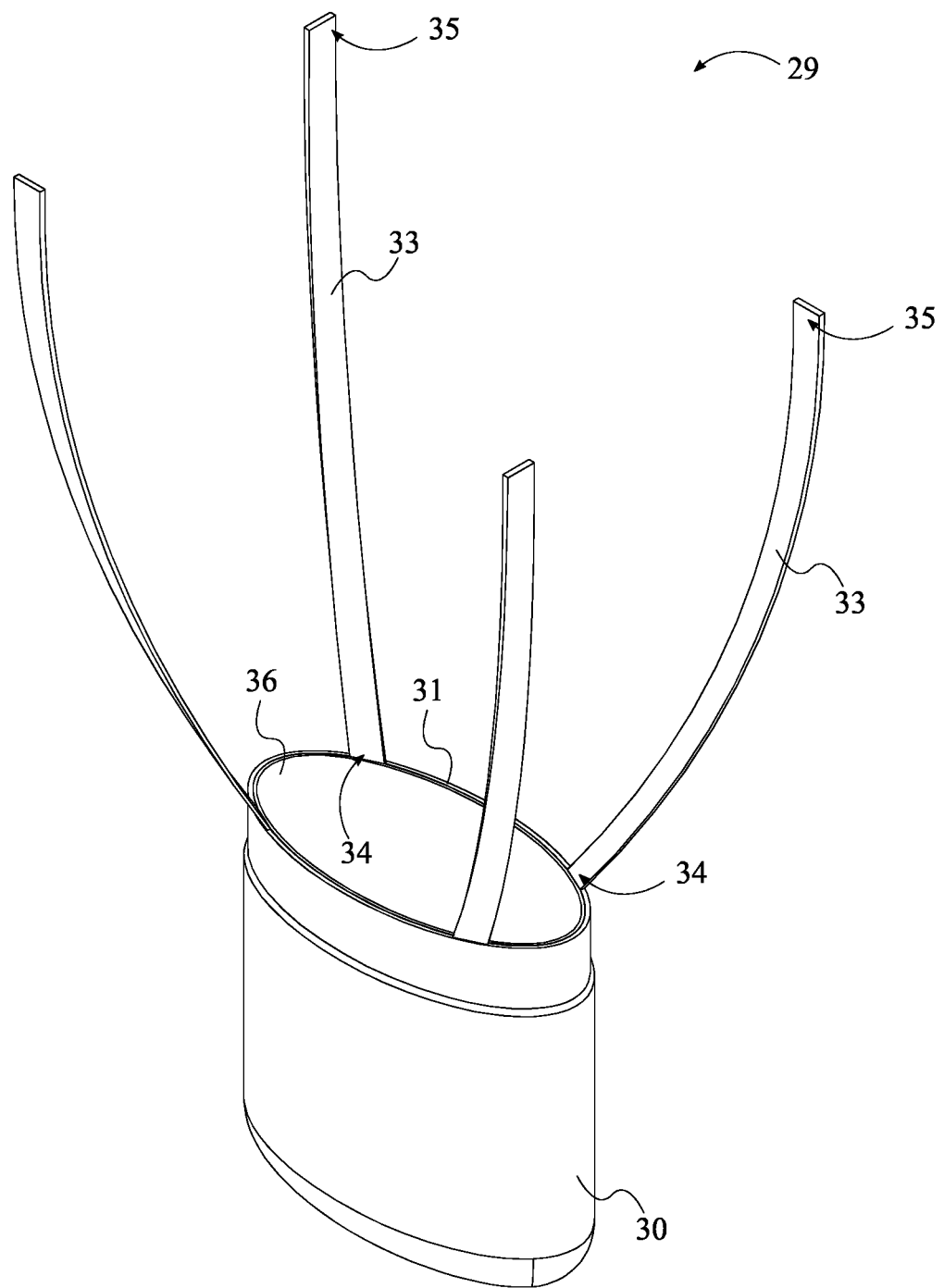
FIG. 13 is a top front perspective view showing the waste container of the present invention.
Figure 14:
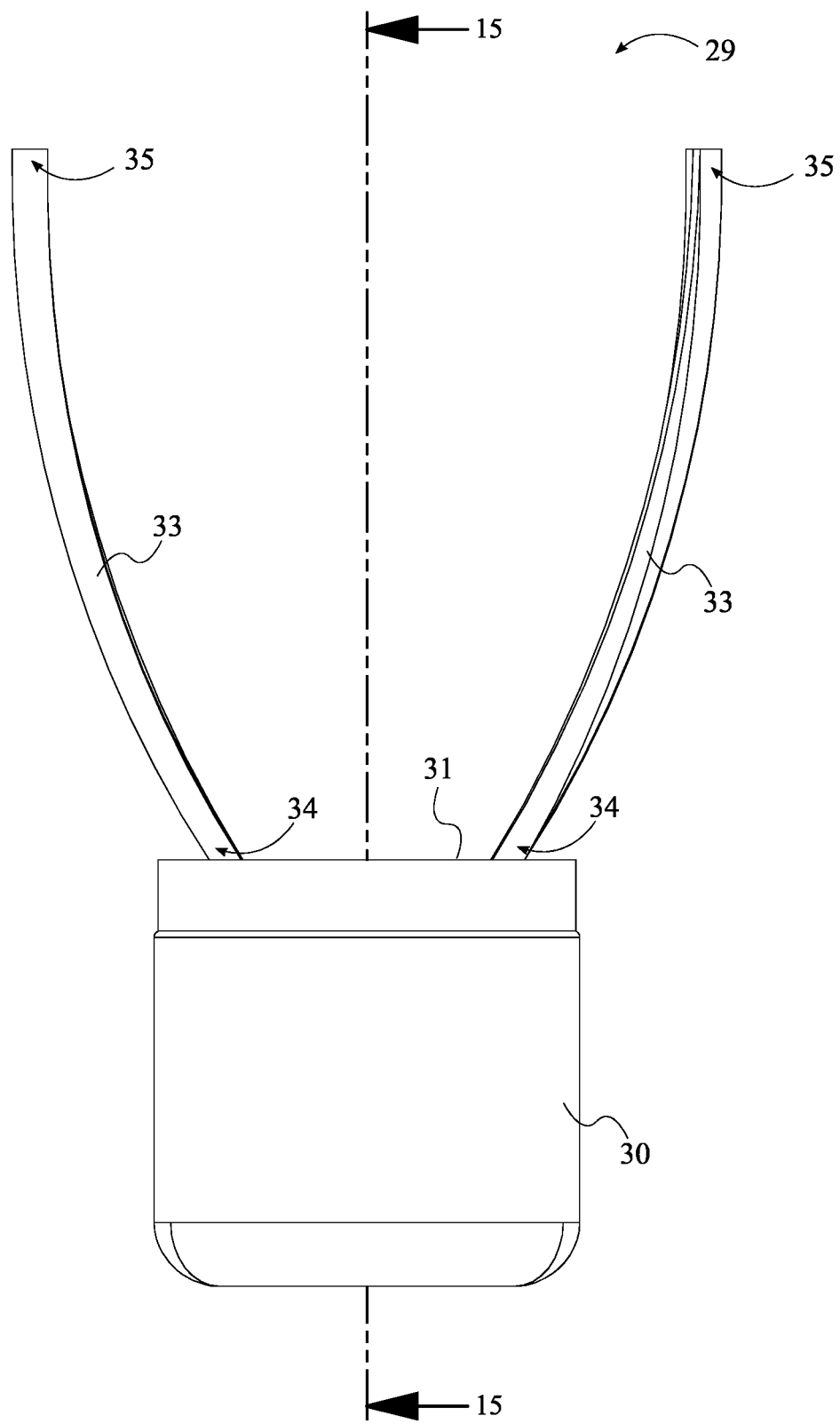
FIG. 14 is a front view showing the waste container of the present invention.
Figure 15:
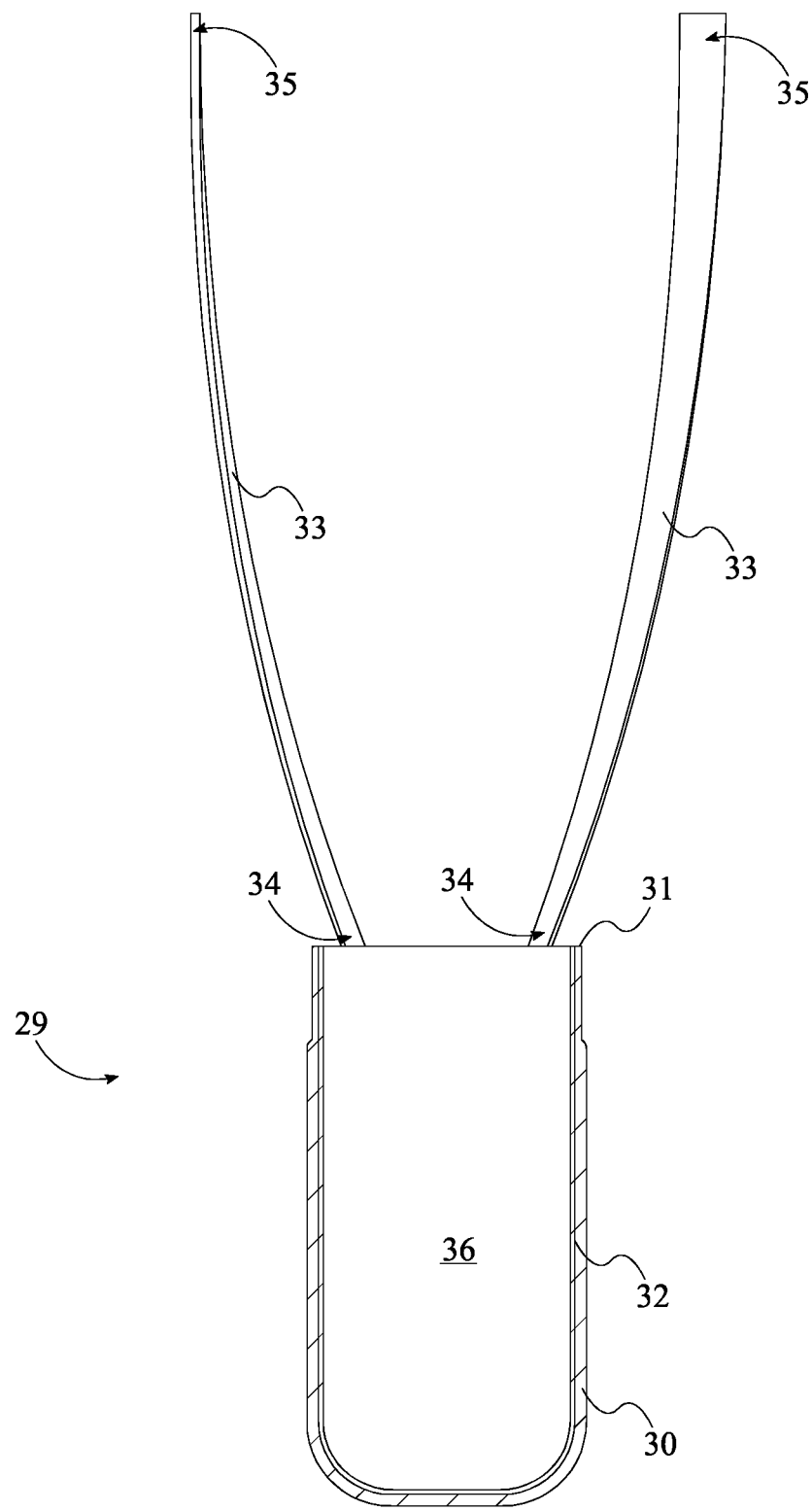
FIG. 15 is an enlarged cross-sectional view taken along line 15-15 in FIG. 14.
Figure 16:
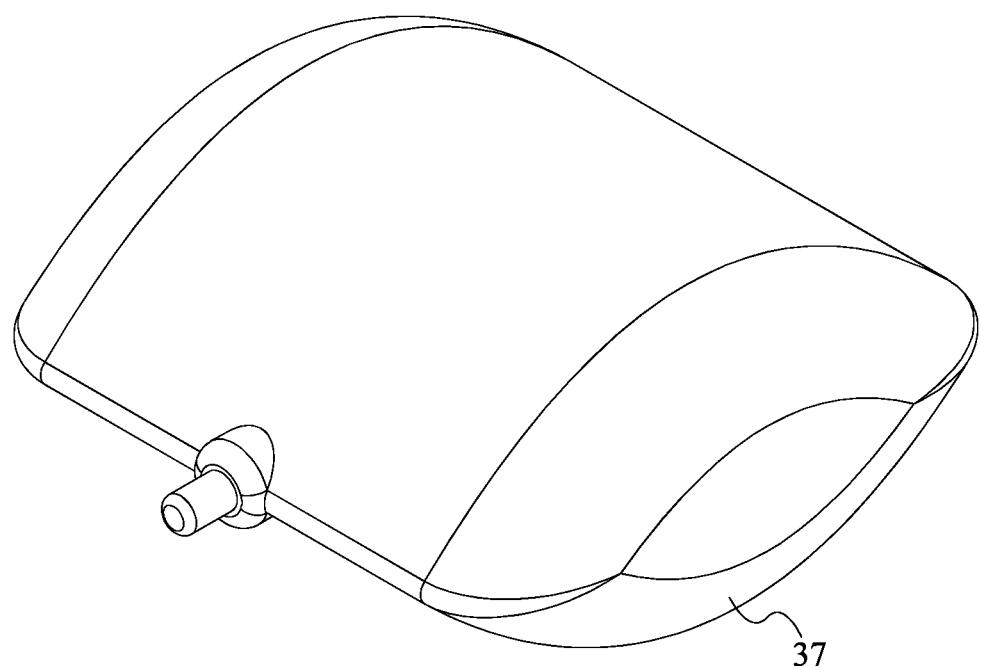
FIG. 16 is a top front perspective view showing the inflatable riser of the present invention.

In one embodiment, the waste container 29 may comprise a container body 30 and a plurality of container straps 33. As can be seen in FIGS. 13 through 15, the container body 30 is designed to retain the used tissues as well as other waste safely while the vehicle is in motion. The plurality of container straps 33 helps tether the container body 30 to the cover body 2. The container body 30 comprises a container rim 31 corresponding to the edge of the main opening of the container body 30. Further, each of the plurality of container straps 33 comprises a first strap end 34 and a second strap end 35 corresponding to the terminal ends of each container strap. To ensure that the container body 30 is properly balanced when hanging from the cover body 2, the plurality of container straps 33 is radially distributed about the container rim 31. The first strap end 34 of each of the plurality of container straps 33 is connected to the container rim 31 to secure the container straps to the container body 30. Then, the second strap end 35 of each of the plurality of container straps 33 is laterally connected to the cover body 2, adjacent to the holder hatch 12, to connect the container body 30 to the cover body 2. Fasteners such as hook and loop fasteners can be used to connect the second strap end 35 to the cover body 2. However, other fasteners can be utilized that enable the second strap end 35 to be detachably connected to the cover body 2.

Furthermore, to maintain a sanitary embodiment within the vehicle, the present invention may further comprise an inner lining 36 that is placed within the container body 30 to prevent liquids and other fluids from leaking through the container body 30. As can be seen in FIGS. 13 through 15, the container body 30 may further comprise an inner surface 32 due to the container body 30 being a hollow structure. To secure the inner lining 36 to the container body 30, the inner lining 36 is mounted coextensive with the inner surface 32 so that the inner lining 36 fully covers the inner surface 32. This way, all waste is retained within the container body 30 until the user can empty out the container body 30 in a safe location. The inner lining 36 also enables cleaning of the container body 30, which is helpful to prevent spread of diseases. In other embodiments, the waste container 29 can be provided as a separate accessory that can be placed offset from the holder body 11.

As previously discussed, the present invention can accommodate tissue boxes of different sizes within the holder body 11. As can be seen in FIGS. 1 through 6 and 16, to do so, the present invention may further comprise an inflatable riser 37. The inflatable riser 37 enables the user to always position the tissue box close to the holder opening 21 within the holder body 11. This ensures that the tissue box can be easily reached through the cover opening 8 and the holder opening 21 to retrieve a tissue. The inflatable riser 37 is positioned within the holder body 11, adjacent to the holder hatch 12, to move the tissue box within the holder body 11 closer to the holder opening 21. The inflatable riser 37 may include a valve through which the user can inflate the inflatable riser 37 to different volumes. This way, tissue boxes of different sizes can snuggly fit within the holder body 11 while ensuring accessibility to the tissues stored within.

Although the invention has been explained in relation to its preferred embodiment, it is to be understood that many other possible modifications and variations can be made without departing from the spirit and scope of the invention.

What is claimed is:

1. A suspended tissue-box holder assembly comprising:
   a holder cover;
   a box holder;
   the box holder comprising a holder body, a holder opening, a left suspension strap, and a right suspension strap;
   the holder cover comprising a cover body and a cover opening;
   the holder body comprising a holder hatch and a top panel;
   the top panel and the holder hatch being positioned opposite to each other about the holder body;
   the holder opening traversing into the holder body through the top panel;
   the left suspension strap and the right suspension strap being positioned opposite to each other about the holder body;
   the left suspension strap being laterally connected to the holder body, adjacent to the top panel;
   the right suspension strap being laterally connected to the holder body, adjacent to the top panel;
   the cover opening traversing through the cover body;
   the cover opening being positioned coincident with the holder opening; and
   the cover body being mounted onto the holder body.

2. The suspended tissue-box holder assembly as claimed in claim 1 comprising:
   the holder body further comprising a front lengthwise panel, a rear lengthwise panel, a left widthwise panel, and a right widthwise panel;
   the front lengthwise panel and the rear lengthwise panel being positioned opposite to each other about the holder body;
   the left widthwise panel and the right widthwise panel being positioned opposite to each other about the holder body;
   the left widthwise panel and the right widthwise panel being positioned in between the front lengthwise panel and the rear lengthwise panel;
   the left widthwise panel, the right widthwise panel, the front lengthwise panel, and the rear lengthwise panel being positioned perpendicular to the top panel;
   the left suspension strap being laterally connected to the left widthwise panel; and
   the right suspension strap being laterally connected to the right widthwise panel.

3. The suspended tissue-box holder assembly as claimed in claim 2 comprising:
   the left suspension strap and the right suspension strap each comprising a first strap section, a second strap section, and a strap fastener;
   the first strap section and the second strap section each comprising a proximal strap end and a distal strap end;
   the proximal strap end of the first strap section of the left suspension strap being connected to the left widthwise panel, adjacent to the front lengthwise panel;
   the proximal strap end of the second strap section of the left suspension strap being connected to the left widthwise panel, adjacent to the rear lengthwise panel;
   the proximal strap end of the first strap section of the right suspension strap being connected to the right widthwise panel, adjacent to the front lengthwise panel;
   the proximal strap end of the second strap section of the right suspension strap being connected to the right widthwise panel, adjacent to the rear lengthwise panel; and
   the distal strap end of the first strap section and the distal strap end of the second strap section being attached onto each other by the strap fastener.

4. The suspended tissue-box holder assembly as claimed in claim 2 comprising:
   the holder hatch comprising a first hatch panel, a second hatch panel, and a hatch fastener;
   the first hatch panel being hingedly connected to the front lengthwise panel;
   the second hatch panel being hingedly connected to the rear lengthwise panel; and
   the first hatch panel the second hatch panel being attached onto each other by the hatch fastener.

5. The suspended tissue-box holder assembly as claimed in claim 1 comprising:
   the cover body comprising a cover panel, a front lengthwise flap, a rear lengthwise flap, a left widthwise flap, and a right widthwise flap;
   the cover panel being positioned onto and across the top panel;
   the front lengthwise flap and the rear lengthwise flap being positioned opposite to each other across the cover panel;
   the left widthwise flap and the right widthwise flap being positioned opposite to each other across the cover panel;
   the left widthwise flap and the right widthwise flap being positioned in between the front lengthwise flap and the rear lengthwise flap; and
   the front lengthwise flap, the rear lengthwise flap, the left widthwise flap, and the right widthwise flap being hingedly connected to the cover panel.

6. The suspended tissue-box holder assembly as claimed in claim 5 comprising:
   the holder cover further comprising a cover ornament;
   the cover ornament being positioned adjacent to the cover opening; and
   the cover ornament being mounted onto the cover panel, opposite to the holder body.

7. The suspended tissue-box holder assembly as claimed in claim 1 comprising:
   a waste container;
   the waste container being positioned offset from the holder hatch; and
   the waste container being tethered to the cover body.

8. The suspended tissue-box holder assembly as claimed in claim 7 comprising:
   the waste container comprising a container body and a plurality of container straps;

the container body comprising a container rim;
each of the plurality of container straps comprising a first strap end and a second strap end;
the plurality of container straps being radially distributed about the container rim;
the first strap end of each of the plurality of container straps being connected to the container rim; and
the second strap end of each of the plurality of container straps being laterally connected to the cover body, adjacent to the holder hatch.

9. The suspended tissue-box holder assembly as claimed in claim 8 comprising:
an inner lining;
the container body comprising an inner surface; and
the inner lining being mounted coextensive with the inner surface.

10. The suspended tissue-box holder assembly as claimed in claim 1 comprising:
an inflatable riser; and
the inflatable riser being positioned within the holder body, adjacent to the holder hatch.

11. A suspended tissue-box holder assembly comprising:
a holder cover;
a box holder;
a waste container;
the box holder comprising a holder body, a holder opening, a left suspension strap, and a right suspension strap;
the holder cover comprising a cover body and a cover opening;
the holder body comprising a holder hatch and a top panel;
the top panel and the holder hatch being positioned opposite to each other about the holder body;
the holder opening traversing into the holder body through the top panel;
the left suspension strap and the right suspension strap being positioned opposite to each other about the holder body;
the left suspension strap being laterally connected to the holder body, adjacent to the top panel;
the right suspension strap being laterally connected to the holder body, adjacent to the top panel;
the cover opening traversing through the cover body;
the cover opening being positioned coincident with the holder opening;
the cover body being mounted onto the holder body;
the waste container being positioned offset from the holder hatch; and
the waste container being tethered to the cover body.

12. The suspended tissue-box holder assembly as claimed in claim 11 comprising:
the holder body further comprising a front lengthwise panel, a rear lengthwise panel, a left widthwise panel, and a right widthwise panel;
the holder hatch comprising a first hatch panel, a second hatch panel, and a hatch fastener;
the front lengthwise panel and the rear lengthwise panel being positioned opposite to each other about the holder body;
the left widthwise panel and the right widthwise panel being positioned opposite to each other about the holder body;
the left widthwise panel and the right widthwise panel being positioned in between the front lengthwise panel and the rear lengthwise panel;
the left widthwise panel, the right widthwise panel, the front lengthwise panel, and the rear lengthwise panel being positioned perpendicular to the top panel;
the left suspension strap being laterally connected to the left widthwise panel;
the right suspension strap being laterally connected to the right widthwise panel;
the first hatch panel being hingedly connected to the front lengthwise panel;
the second hatch panel being hingedly connected to the rear lengthwise panel; and
the first hatch panel the second hatch panel being attached onto each other by the hatch fastener.

13. The suspended tissue-box holder assembly as claimed in claim 12 comprising:
the left suspension strap and the right suspension strap each comprising a first strap section, a second strap section, and a strap fastener;
the first strap section and the second strap section each comprising a proximal strap end and a distal strap end;
the proximal strap end of the first strap section of the left suspension strap being connected to the left widthwise panel, adjacent to the front lengthwise panel;
the proximal strap end of the second strap section of the left suspension strap being connected to the left widthwise panel, adjacent to the rear lengthwise panel;
the proximal strap end of the first strap section of the right suspension strap being connected to the right widthwise panel, adjacent to the front lengthwise panel;
the proximal strap end of the second strap section of the right suspension strap being connected to the right widthwise panel, adjacent to the rear lengthwise panel; and
the distal strap end of the first strap section and the distal strap end of the second strap section being attached onto each other by the strap fastener.

14. The suspended tissue-box holder assembly as claimed in claim 11 comprising:
the cover body comprising a cover panel, a front lengthwise flap, a rear lengthwise flap, a left widthwise flap, a right widthwise flap, and a cover ornament;
the cover panel being positioned onto and across the top panel;
the front lengthwise flap and the rear lengthwise flap being positioned opposite to each other across the cover panel;
the left widthwise flap and the right widthwise flap being positioned opposite to each other across the cover panel;
the left widthwise flap and the right widthwise flap being positioned in between the front lengthwise flap and the rear lengthwise flap;
the front lengthwise flap, the rear lengthwise flap, the left widthwise flap, and the right widthwise flap being hingedly connected to the cover panel;
the cover ornament being positioned adjacent to the cover opening; and
the cover ornament being mounted onto the cover panel, opposite to the holder body.

15. The suspended tissue-box holder assembly as claimed in claim 11 comprising:
an inner lining;
the waste container comprising a container body and a plurality of container straps;
the container body comprising a container rim and inner surface;

each of the plurality of container straps comprising a first strap end and a second strap end;
the plurality of container straps being radially distributed about the container rim;
the first strap end of each of the plurality of container straps being connected to the container rim;
the second strap end of each of the plurality of container straps being laterally connected to the cover body, adjacent to the holder hatch; and
the inner lining being mounted coextensive with the inner surface.

16. The suspended tissue-box holder assembly as claimed in claim 11 comprising:
an inflatable riser; and
the inflatable riser being positioned within the holder body, adjacent to the holder hatch.

17. A suspended tissue-box holder assembly comprising:
a holder cover;
a box holder;
a waste container;
an inflatable riser;
the box holder comprising a holder body, a holder opening, a left suspension strap, and a right suspension strap;
the holder cover comprising a cover body and a cover opening;
the holder body comprising a holder hatch and a top panel;
the top panel and the holder hatch being positioned opposite to each other about the holder body;
the holder opening traversing into the holder body through the top panel;
the left suspension strap and the right suspension strap being positioned opposite to each other about the holder body;
the left suspension strap being laterally connected to the holder body, adjacent to the top panel;
the right suspension strap being laterally connected to the holder body, adjacent to the top panel;
the cover opening traversing through the cover body;
the cover opening being positioned coincident with the holder opening;
the cover body being mounted onto the holder body;
the waste container being positioned offset from the holder hatch;
the waste container being tethered to the cover body; and
the inflatable riser being positioned within the holder body, adjacent to the holder hatch.

18. The suspended tissue-box holder assembly as claimed in claim 17 comprising:
the holder body further comprising a front lengthwise panel, a rear lengthwise panel, a left widthwise panel, and a right widthwise panel;
the holder hatch comprising a first hatch panel, a second hatch panel, and a hatch fastener;
the left suspension strap and the right suspension strap each comprising a first strap section, a second strap section, and a strap fastener;
the first strap section and the second strap section each comprising a proximal strap end and a distal strap end;
the front lengthwise panel and the rear lengthwise panel being positioned opposite to each other about the holder body;
the left widthwise panel and the right widthwise panel being positioned opposite to each other about the holder body;
the left widthwise panel and the right widthwise panel being positioned in between the front lengthwise panel and the rear lengthwise panel;
the left widthwise panel, the right widthwise panel, the front lengthwise panel, and the rear lengthwise panel being positioned perpendicular to the top panel;
the left suspension strap being laterally connected to the left widthwise panel;
the right suspension strap being laterally connected to the right widthwise panel;
the first hatch panel being hingedly connected to the front lengthwise panel;
the second hatch panel being hingedly connected to the rear lengthwise panel;
the first hatch panel the second hatch panel being attached onto each other by the hatch fastener;
the proximal strap end of the first strap section of the left suspension strap being connected to the left widthwise panel, adjacent to the front lengthwise panel;
the proximal strap end of the second strap section of the left suspension strap being connected to the left widthwise panel, adjacent to the rear lengthwise panel;
the proximal strap end of the first strap section of the right suspension strap being connected to the right widthwise panel, adjacent to the front lengthwise panel;
the proximal strap end of the second strap section of the right suspension strap being connected to the right widthwise panel, adjacent to the rear lengthwise panel; and
the distal strap end of the first strap section and the distal strap end of the second strap section being attached onto each other by the strap fastener.

19. The suspended tissue-box holder assembly as claimed in claim 17 comprising:
the cover body comprising a cover panel, a front lengthwise flap, a rear lengthwise flap, a left widthwise flap, a right widthwise flap, and a cover ornament;
the cover panel being positioned onto and across the top panel;
the front lengthwise flap and the rear lengthwise flap being positioned opposite to each other across the cover panel;
the left widthwise flap and the right widthwise flap being positioned opposite to each other across the cover panel;
the left widthwise flap and the right widthwise flap being positioned in between the front lengthwise flap and the rear lengthwise flap;
the front lengthwise flap, the rear lengthwise flap, the left widthwise flap, and the right widthwise flap being hingedly connected to the cover panel;
the cover ornament being positioned adjacent to the cover opening; and
the cover ornament being mounted onto the cover panel, opposite to the holder body.

20. The suspended tissue-box holder assembly as claimed in claim 17 comprising:
an inner lining;
the waste container comprising a container body and a plurality of container straps;
the container body comprising a container rim and inner surface;
each of the plurality of container straps comprising a first strap end and a second strap end;
the plurality of container straps being radially distributed about the container rim;

the first strap end of each of the plurality of container straps being connected to the container rim;

the second strap end of each of the plurality of container straps being laterally connected to the cover body, adjacent to the holder hatch; and the inner lining being mounted coextensive with the inner surface.

\* \* \* \* \*